(12) United States Patent
Woo et al.

(10) Patent No.: US 10,270,273 B2
(45) Date of Patent: Apr. 23, 2019

(54) CHARGING APPARATUS MOUNTED IN VEHICLE

(71) Applicant: HYUNDAI MOTOR COMPANY, Seoul (KR)

(72) Inventors: Dong Gyun Woo, Suwon-si (KR); Hui Sung Jang, Suwon-si (KR); Hyun Wook Seong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/588,086

(22) Filed: May 5, 2017

(65) Prior Publication Data
US 2018/0131194 A1 May 10, 2018

(30) Foreign Application Priority Data
Nov. 9, 2016 (KR) .................. 10-2016-0149061

(51) Int. Cl.
| | | |
|---|---|---|
| H02J 7/00 | (2006.01) | |
| H02M 1/00 | (2006.01) | |
| H02M 1/14 | (2006.01) | |
| H02M 1/32 | (2007.01) | |
| H02M 1/42 | (2007.01) | |
| H02M 7/23 | (2006.01) | |

(52) U.S. Cl.
CPC ............ H02J 7/007 (2013.01); H02M 1/14 (2013.01); H02M 1/4208 (2013.01); H02M 7/23 (2013.01); H02M 1/32 (2013.01); H02M 2001/007 (2013.01); Y02B 70/126 (2013.01)

(58) Field of Classification Search
CPC ....................................... H02J 1/10

USPC ..................................... 320/136
See application file for complete search history.

(56) References Cited

U.S. PATENT DOCUMENTS

| | | | | | |
|---|---|---|---|---|---|
| 6,166,934 | A | * | 12/2000 | Kajouke | ............. B60L 1/00 363/65 |
| 2007/0248877 | A1 | * | 10/2007 | Qahoug | ............. H02J 1/10 429/121 |
| 2009/0160407 | A1 | * | 6/2009 | Hwang | ............. H02J 7/0073 320/157 |

(Continued)

FOREIGN PATENT DOCUMENTS

| | | |
|---|---|---|
| JP | 4691588 B2 | 6/2011 |
| KR | 20150053452 A | 5/2015 |

(Continued)

*Primary Examiner* — David V Henze-Gongola
(74) *Attorney, Agent, or Firm* — Brinks Gilson & Lione (57) ABSTRACT

Disclosed is a charging apparatus mounted in a vehicle. The charging apparatus includes at least two power modules parallel to each other to convert input power applied from an outside into a charging power for charging a high-voltage battery, at least two slave controllers that outputs information about whether each of the power modules enters a constant-voltage charging mode, based on the charging power output from the power modules, and a master controller that determines whether the at least two power modules enter the constant-voltage charging mode by utilizing the information, which is received from the slave controllers, about whether each of the power modules enters the constant-voltage charging mode, wherein the master controller controls such that one of the power modules is operated when the power modules enter the constant-voltage charging mode.

11 Claims, 5 Drawing Sheets

(56) References Cited

U.S. PATENT DOCUMENTS

2016/0020695 A1 1/2016 Zhang et al.
2016/0096441 A1 4/2016 Lee et al.

FOREIGN PATENT DOCUMENTS

| KR | 10-2015-0084625 A | 7/2015 |
| KR | 10-1592742 B1 | 2/2016 |
| KR | 10-1619618 B1 | 4/2016 |

* cited by examiner

CHARGING APPARATUS MOUNTED IN VEHICLE

CROSS-REFERENCE TO RELATED APPLICATION

This application is based on and claims the benefit of priority to Korean Patent Application No. 10-2016-0149061, filed on Nov. 9, 2016, in the Korean Intellectual Property Office, the disclosure of which is incorporated herein in its entirety by reference.

TECHNICAL FIELD

The present disclosure relates to a charging apparatus mounted in a vehicle, which is capable of controlling such that a battery is charged through only one power module when entering a constant voltage (CV) charging section while an on-board charger (OBC) including a plurality of power modules connected in parallel to each other charges the battery.

BACKGROUND

In general, an eco-friendly vehicle may be classified as an electric vehicle, a fuel cell vehicle, a natural gas vehicle, or a hybrid vehicle based on a kind of used power source. Specifically, it is possible to classify a battery based eco-friendly vehicle as a hybrid electric vehicle, a plug-in hybrid electric vehicle, or an electric vehicle based on the capacity of a battery or all-electric range thereof. Among them, the hybrid electric vehicle and the electric vehicle necessarily require a separate charging apparatus for charging a high-capacity battery and are equipped with a vehicle-mounted on-board charger (OBC) capable of charging the battery with a home power source.

As the technique of manufacturing a battery has been advanced more than at an early stage of developing an electric vehicle, the capacity of a high-voltage battery mounted on a vehicle is increased, so that OBC products of 6.6 kW next to 3.3 kW have been on the market. However, in a case of a vehicle equipped with a high-voltage battery of about 50 kWh or more, even though an OBC of 6.6 kW is used, it takes about 8 hours to charge the battery.

To overcome the limitation of the related art, a scheme of providing a plurality of power modules connected in parallel to each other into the OBC to increase rating power of the OBC has been introduced. The OBC including a plurality of power modules connected in parallel to each other performs a charging operation in the order of constant current (CC), constant power (CP) and constant voltage (CV). When the charging operation enters the CV charging section, an output current imbalance phenomenon (load imbalance phenomenon) occurs between power modules.

To overcome the output current imbalance between the power modules during such parallel driving, according to the related art, there have been proposed a droop method and an active current distribution method.

According to the droop method, since the negative input of an output voltage compensator of each power module is a value obtained by adding information about an output voltage obtained by detecting an output current thereto, when the output current is increased, a pulse width modulation (PWM) duty, which is a final output of a controller, is reduced, so that the output voltage is reduced. In this case, when a sensing gain of the output current is high, although a load current distribution property between modules is improved, a variation range of the output voltage is enlarged. Thus, it is required to permit some degree of error in current distribution to narrower the voltage variation range.

According to the active current distribution method, as a direction value of an output current of each power module, an output current value of a representative module or an average value of output currents of all power modules may be used according to the magnitude of a scale constant. By reducing the output voltage direction value when the output current of a corresponding module is great compared with a current direction value, the output current is reduced. However, since information about output currents of all power modules is required to be transferred to a master controller, the configuration is complex and the reliability is deteriorated due to a current sensing error.

SUMMARY

The present disclosure has been made to solve the above-mentioned problems occurring in the prior art while advantages achieved by the prior art are maintained intact.

The present disclosure is to provide an charging apparatus mounted in a vehicle, which is capable of charging a battery through one of a plurality of power modules connected in parallel to each other and included in an on-board charger (OBC) when the battery charging operation enters a constant voltage (CV) charging section while the battery is charged through the OBC.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, there is provided a charging apparatus mounted in a vehicle. The charging apparatus includes at least two power modules that are parallel to each other to convert input power applied from an outside into a charging power for charging a high-voltage battery, at least two slave controllers that outputs information about whether each of the at least two power modules enters a constant-voltage charging mode, based on the charging power output from the at least two power modules, and a master controller that determines whether the at least two power modules enter the constant-voltage charging mode by utilizing the information, which is received from the at least two slave controllers, about whether each of the at least two power modules enters the constant-voltage charging mode, wherein the master controller controls such that one of the at least two power modules is operated when the at least two power modules enter the constant-voltage charging mode.

The charging apparatus may further include a first filter that removes a switching ripple of the input power and to output a ripple-removed input power to the at least two power modules, and a second filter that reduces a switching ripple of the charging power output from the at least two power modules.

Each of the at least two power modules may include a power factor correction converter that converts AC power input from an outside into DC power and perform power factor correction, and a DC-DC converter that converts the DC power into a charging voltage for charging the high-voltage battery.

The at least two slave controllers may compare an output current direction value with an output current threshold value and to transfer, to the master controller, a comparison result as the information about whether each of the at least two power modules enters the constant-voltage charging mode.

The output current direction value may be a maximum output current value allowable in a constant current charging section.

The output current direction value may be a value obtained by dividing a maximum output power value able to be output in a constant current charging section by an actual measured output voltage.

The master controller may include an OR gate that OR-operates the information (implements logical disjunction on the information), which is output from the at least two slave controllers, about whether the at least two power modules enter the constant-voltage charging mode.

The master controller may determine whether the at least two slave controllers enter the constant-voltage charging mode, based on an output of the OR gate.

The master controller may determine that the at least two power modules enter the constant-voltage charging mode when receiving, from the at least two slave controllers, information about that the at least two power modules enter the constant-voltage charging mode.

The master controller may provide, as an output voltage direction value, a maximum value in a driving voltage range of the high-voltage battery to one of the at least two slave controllers, and may provide, as an output voltage direction value, '0' to remaining slave controllers.

The master controller may provide an output voltage direction value, a maximum value of an allowable output current, a maximum value of an output power able to be output, and an output current threshold value to each of the at least two slave controllers.

The output current threshold value may correspond to an output current at a time point of switching from a constant-power charging section to a constant-voltage charging section.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Throughout the specification, when some part 'comprises', 'includes' or 'has' some elements, unless explicitly described to the contrary, it means that other elements may be further included but not excluded.

In addition, the terms '-unit', '-or(er)', and 'module' described in the specification mean units for processing at least one function or operation, which can be implemented by hardware or software and any combination thereof. In addition, as used in the specification, the singular forms 'a', 'an', 'one', and 'the' are intended to include the plural forms as well unless the context clearly dictates otherwise or it is explicitly stated otherwise.

Hereinafter, embodiments of the present disclosure will be described in detail with reference to the accompanying drawings.

The present disclosure relates to an on-board charger (OBC) mounted in a vehicle, which is used for an electric vehicle (EV) and a plug-in hybrid electric vehicle (PHEV), and is to fundamentally solve problems, which may be caused during parallel driving, by proposing a driving control strategy of a multi-parallel OBC mounted in a vehicle in consideration of a charge profile of the multi-parallel OBC.

Specifically, according to the present disclosure, the multi-parallel OBC including a plurality of power modules configured to be parallel to each other performs charging in the order of constant current (CC), constant power (CP) and constant voltage (CV). Since an output current imbalance phenomenon (load imbalance phenomenon) occurs between power modules when the OBC enters a CV charging section, the OBC controls (drives) only one power module (slave controller) to charge the battery.

Figure 1:
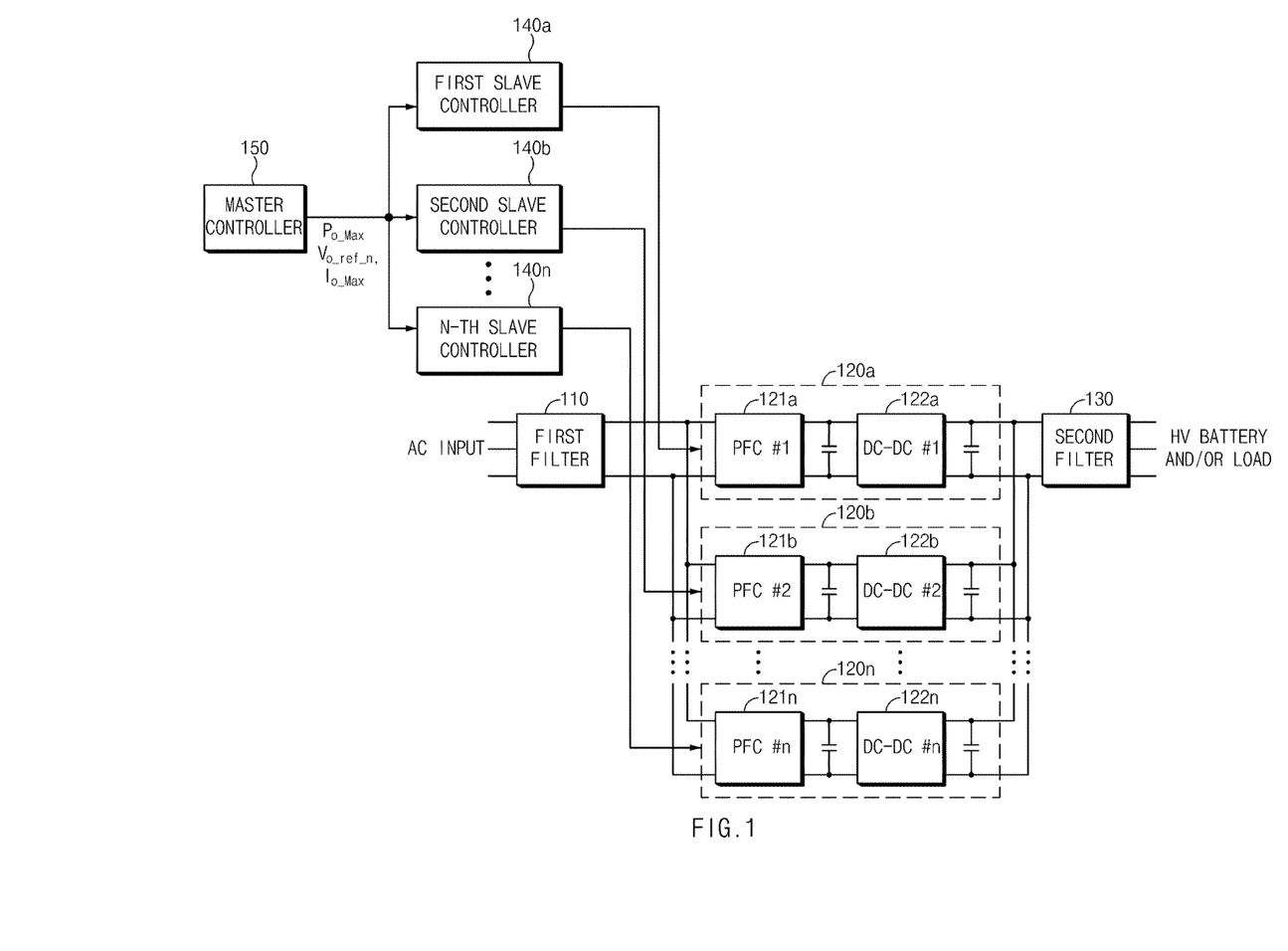
FIG. 1 is a block diagram illustrating a charging apparatus mounted in a vehicle according to an embodiment of the present disclosure.
Figure 2:
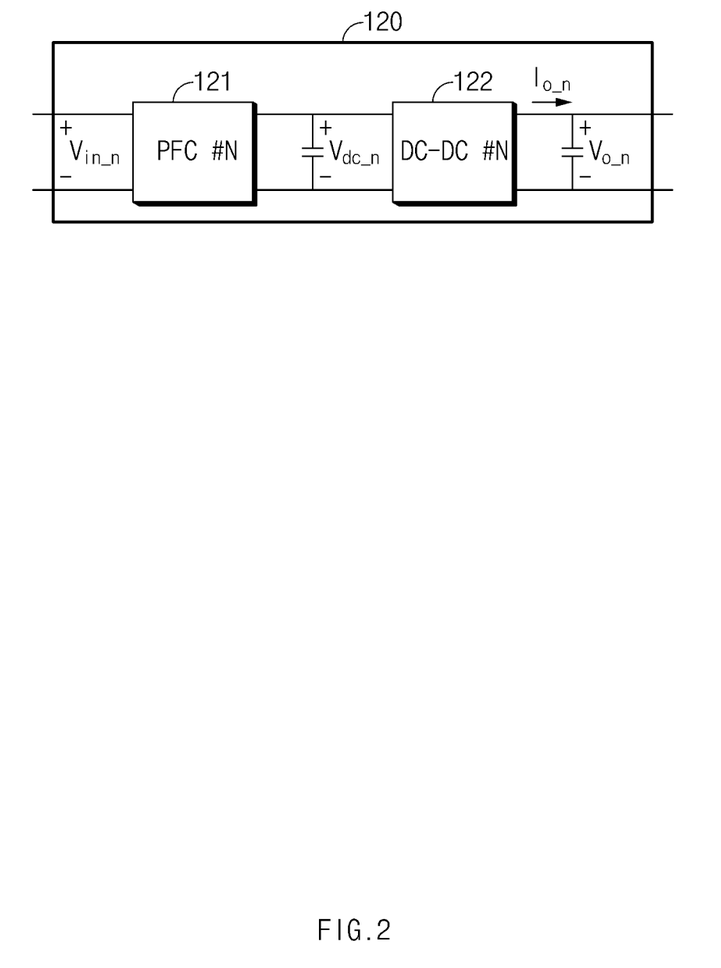
FIG. 2, is a block diagram illustrating the configuration of a single power module in the charging apparatus depicted in FIG. 1.
Figure 3:
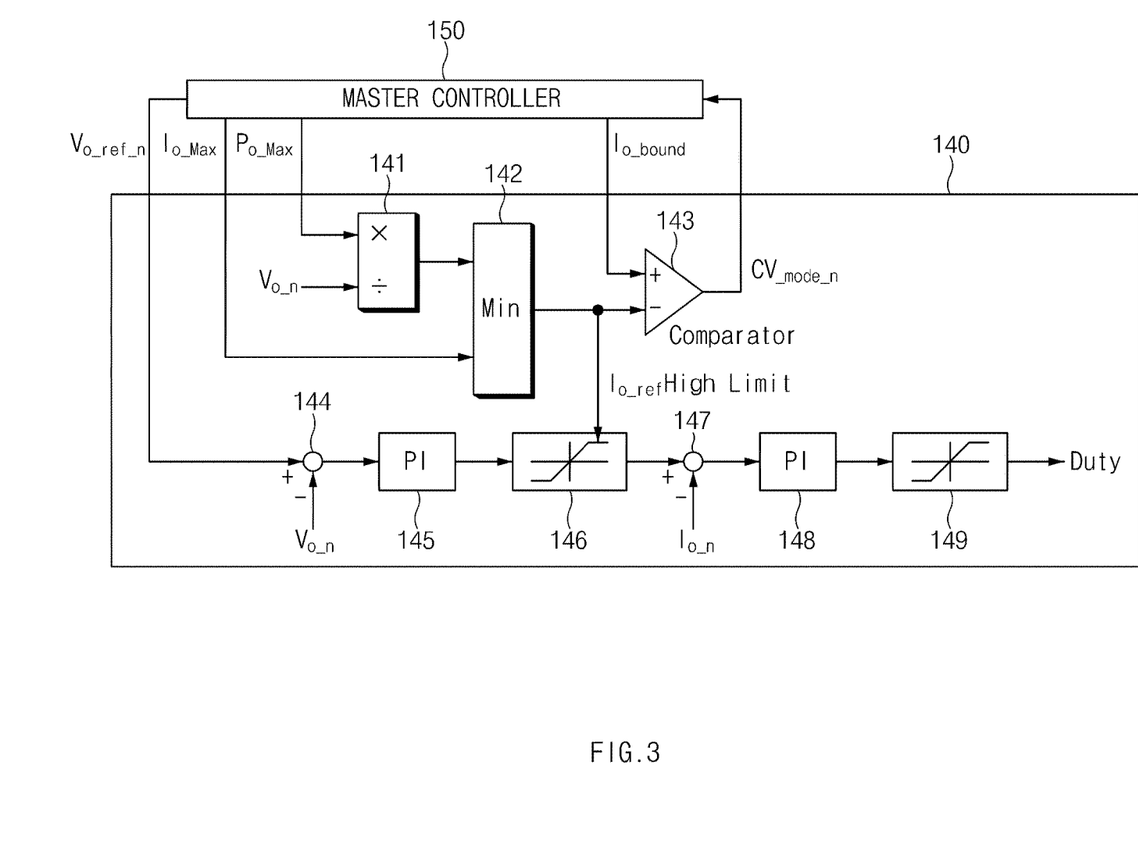
FIG. 3 is a block diagram illustrating the configuration of a single slave controller depicted in FIG. 1.
Figure 4:
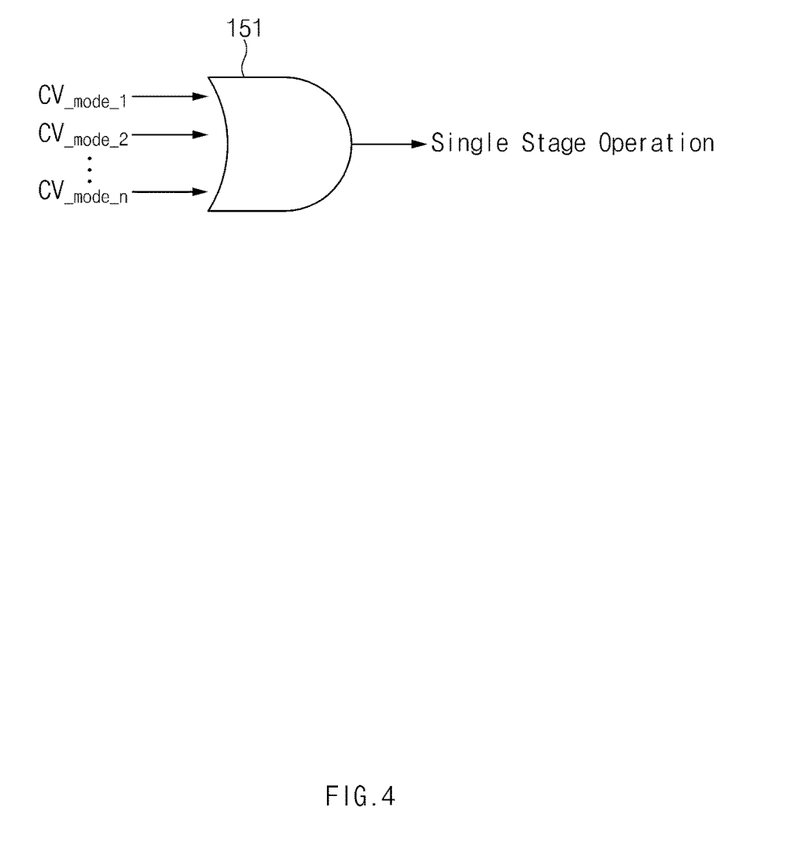
FIG. 4 is a view illustrating that it is determined whether a master controller of FIG. 1 enters a CV charging mode.

FIG. 1 is a block diagram illustrating a charging apparatus mounted in a vehicle according to an embodiment of the present disclosure. FIG. 2 is a block diagram illustrating the configuration of a single power module in the charging apparatus depicted in FIG. 1. FIG. 3 is a block diagram illustrating the configuration of a single slave controller depicted in FIG. 1. FIG. 4 is a view illustrating that it is determined whether a master controller of FIG. 1 enters a CV charging mode.

A charging apparatus mounted in a vehicle includes a first filter 110, at least two power modules (power stage) 120a to 120n, a second filter 130, at least two slave controller 140a to 140n, and a master controller 150.

The first filter 110 removes a switching ripple from AC power (for example, a commercial power source) input from an outside. In other words, the first filter 110 removes noise included in an input voltage. The first filter 110 may be implemented with an electromagnetic interface (EMI) filter.

The power modules 120 or 120a to 120n convert the AC power filtered by the first filter 110 into DC power and provide the DC power to a high-voltage (HV) battery and/or a load.

Each of the power modules 120a to 120n includes a power factor correction (PFC) converter 121a, 121b or 121n and a DC-DC converter 122a, 122b or 122n.

The PFC converter 121 is connected to an output terminal of the first filter 110 to convert an AC voltage $V_{in\_n}$ output from the first filter 110 into a DC voltage $V_{dc\_n}$. In addition, the PFC converter 121 may improve a power factor by reducing reactive components non-contributing to power transmission in the AC voltage. The PFC converter 121 may be implemented with a buck converter, a boost converter, or a buck-boost converter.

The DC-DC converter 122 is connected to an output terminal of the PFC 121 to receive a DC voltage (DC power) output from the PFC converter 121. The DC-DC converter 122 converts the DC voltage input thereto into a charging voltage (charging power, output voltage) for charging the high-voltage battery in a pulse width modulation (PWM) scheme. Thus, the DC-DC converter 122 controls the charging of the high-voltage battery.

In addition, the DC-DC converter 122 may convert the DC voltage input into a supply voltage (supply power) and output the supply voltage to a load connected to an output terminal thereof, where the load may include a lamp, a heater, an air conditioner, a wiper, an anti-lock braking system (ABS) an electronic power steering (EPS), etc.

A voltage meter and a current meter may be installed to the output terminal of the DC-DC converter 122. The voltage meter actually measures an output voltage $V_{o\_n}$ output from each power module 120. The current meter actually measures an output current $I_{o\_n}$ output from each power module 120. The voltage and current meters may be provided in each slave controller 140 to be described below.

The second filter 130 is connected to the output terminals of the DC-DC converters 122a, 122b and 122n to reduce a switching ripple component of the output voltage. In other words, the second filter 130 filters the output voltage to remove noise included in the output voltage. The second filter 130 supplies (transfers) the noise-removed output voltage to the high-voltage battery and/or the load.

The at least two slave controllers 140a to 140n control the at least two power modules 120a to 120n to control the output power sources (output power) output from the at least two power modules 120a to 120n, respectively. In other words, the first slave control 140a controls the first power module 120a, the second slave controller 140b controls the second power module 120b, and the N-th slave controller 140n controls the N-th power module 120n.

Each slave controller 140 (140a, 140b, or 140n) receives, from the main controller 150, an output voltage direction value $V_{o\_ref\_n}$ the maximum value $I_{o\_Max}$ of an allowable output current (output current limitation value), the maximum value $P_{o\_Max}$ of output power able to be output, and an output current threshold value $I_{o\_bound}$ which is an output current at a time point of switching from a CP charging section to a CV charging section.

The output voltage direction value $V_{o\_ref\_n}$ in the CC charging section and the CP charging section is set to the maximum value $V_{batt\_Max}$ in a driving voltage range of the high-voltage battery, so that the output current direction value in the CC charging section is the output current limitation value $I_{o\_Max}$, and the output current direction value in the CP charging section is $P_{o\_Max}/V_{o\_n}$.

Each slave controller 140 includes a first operator 141, a minimum value extractor 142, a comparator 143, a second operator 144, a first proportional-integral (PI) controller 145, a first limiter 146, a third operator 147, a second PI controller 148, and a second limiter 149.

The first operator 141 receives the output power maximum value $P_{o\_Max}$ and an output voltage $V_{o\_n}$ actually measured by the voltage meter connected to the output terminal of each power module 120. The first operator 141 performs a division operation of dividing the output power maximum value $P_{o\_Max}$ by the actually measured output voltage $V_{o\_n}$. The output value $P_{o\_Max}/V_{o\_n}$ of the first operator 141 is the output current direction value in the CP charging section.

The minimum value extractor 142 compares the output current limitation value $I_{o\_n}$, with the operation result output from the first operator 141 to output a smaller value (the magnitude of the output current direction value). That is, the output value output from the minimum value extractor 142 is the uppermost value $I_{o\_ref}$High Limit of the output current direction value.

The comparator 143 compares the output current threshold value $I_{o\_bound}$ transferred from the master controller 150 and the output value $I_{o\_ref}$High Limit output from the minimum value extractor 142 with each other to output a CV charging mode entrance/non-entrance signal $CV_{\_mode\_n}$ as the comparison result. When $I_{o\_bound}$ exceeds $I_{o\_ref}$High Limit, the comparator 143 outputs '1' as CV charging mode entrance information. To the contrary, when $I_{o\_bound}$ is equal to or less than $I_{o\_ref}$High Limit, the comparator 143 outputs '0' as CV charging mode non-entrance information.

The comparator 143 informs the master controller 150 of the CV charging mode entrance/non-entrance signal based on the comparison result. In other words, the comparator 143 transmits (transfers) the comparison result to the master controller 150.

The second operator 144 calculates an output voltage error by subtracting the actually measured output voltage $V_O$, from the output voltage direction value $V_{o\_ref\_n}$.

The first PI controller 145 controls the current control direction value in proportion to the output voltage error output from the second operator 144 and controls the current control direction value by integrating the output voltage error for the purpose of controlling the output voltage.

The first limiter 146 compares the current control direction value output from the first PI controller 145 and the uppermost value $I_{o\_ref}$High Limit of the output current direction value with each other. When the current control direction value (output current direction value) is less than the uppermost value $I_{o\_ref}$High Limit of the output current direction value, the first limiter 146 outputs the current control direction value itself. Meanwhile, when the current control direction value (output current direction value) is equal to or greater than the uppermost value $I_{o\_ref}$High Limit of the output current direction value, the first limiter 146 outputs the uppermost value $I_{o\_ref}$High Limit of the output current direction value.

The third operator 147 subtracts the output value (output current direction value) output from the first limiter 146 from an output current actual measurement value $I_{o\_n}$.

The second PI controller 148 controls an output control value by integrating an error between the output current actual measurement value $I_{o\_n}$ and the output current direction value and controls the output current value in proportion to the error between the output current actual measurement value $I_{o\_n}$ and the output current direction value for the purpose of controlling the output current.

The second limiter 149 restricts the output control value output from the second PI controller 148 to prevent the output control value from being deviated from a duty maximum value duty-max and a duty minimum value duty-min. The second limiter 149 transfers a duty to the DC-DC converter 122 of each power module 120. The DC-DC converter 122 controls the charging voltage output based on the duty under PWM control.

The master controller 150 controls the at least two slave controllers 140a to 140n. The master controller 150 receives the information $CV_{\_mode\_n}$ about CV charging mode entrance/non-entrance from each slave controller 140. The master controller 150 performs OR-operation of the information $CV_{\_mode\_n}$ about CV charging mode entrance/non-entrance through an OR gate 151. If the OR-operation result is '1', the master controller 150 operates only one of the slave controllers 140a to 140n.

In other words, the master controller 150 determines whether to enter the CV charging mode by utilizing the information about CV charging mode entrance/non-entrance transferred from the at least two slave controllers 140a to 140n. When the master controller 150 receives '1s' from all the at least two slave controllers 140a to 140n as the information about CV charging mode entrance, the main controller 150 transfers $V_{batt\_Max}$ to only one of the at least two slave controllers 140a to 140n and transfers '0' to the others as the output voltage direction value $V_{o\_ref\_n}$. Thus, the battery charging control may be performed such that only one power module is driven in the CV charging mode, thereby preventing a load imbalance phenomenon.

Figure 5:
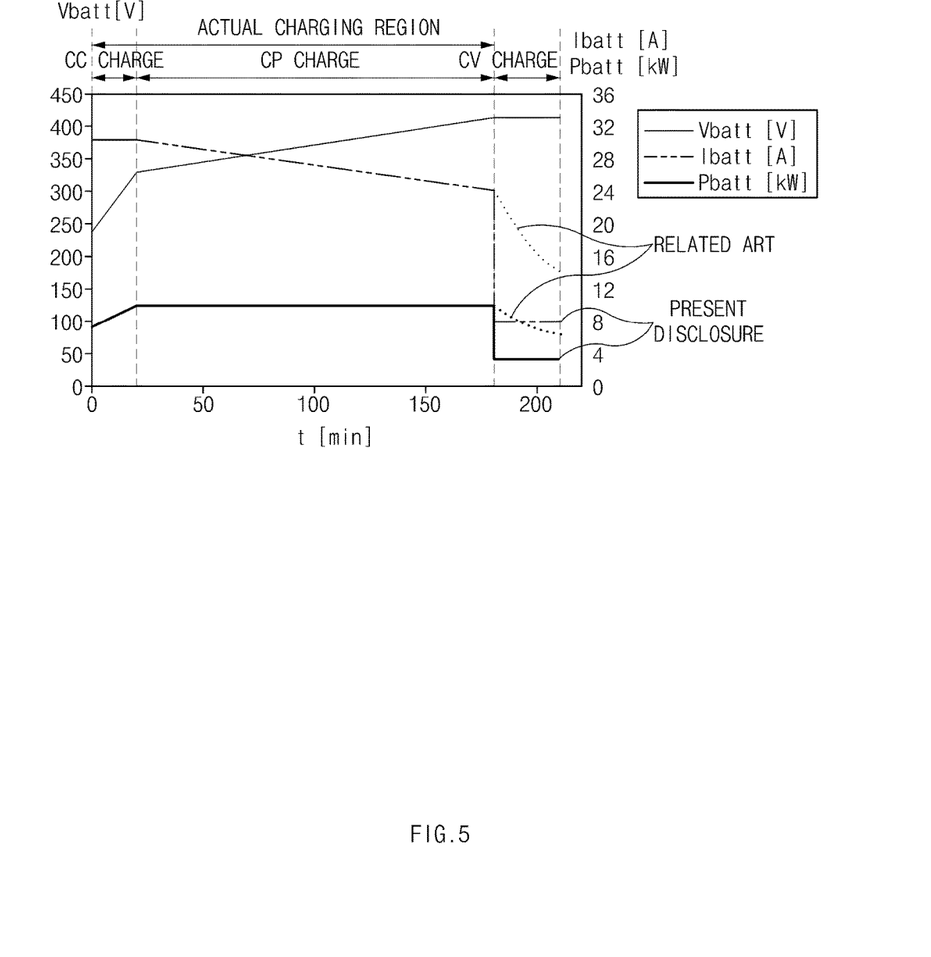
FIG. 5 is a graph illustrating a battery charge profile of a charging apparatus mounted in a vehicle according to an embodiment of the present disclosure.

FIG. 5 is a graph illustrating a battery charge profile of a charging apparatus mounted in a vehicle according to an embodiment of the present disclosure, where the charging apparatus mounted in a vehicle, which is a 10 kW charger, includes three power modules connected in parallel to each other to charge a high-voltage battery of 60 kWh.

In general, an actual charging region of an OBC mounted in a vehicle may include a constant current (CC) charging section and a constant power (CP) charging section. Since each slave controller 140a to 140n performs current control by utilizing the output current limitation value Io_Max transferred from the master controller 150 as a direction value of a current controller, any imbalance phenomena do not occur between the power modules 120a to 120n. However, when the charging goes on to enter the CV charging section, even though each power module 120a to 120n performs constant voltage control, an output current imbalance phenomenon occurs due to output end line impedance imbalance and a sensing error.

Since the CV charging section has an infinitesimal effect on the actual battery charging time so that a separate complex current distributor is unnecessary, the present disclosure proposes control strategy of driving only one of the plurality of power modules 120a to 120n, thereby easily avoiding a current imbalance phenomenon that is a problem of parallel driving.

In addition, since a DC relay exists between the OBC output end and the high-voltage battery, the sole driving control strategy proposed in the present disclosure may be applied even to an initial charging operation. That is, during the initial charging operation, only one of the plurality of power modules may be solely driven.

According to the present disclosure, since a battery is charged through one of a plurality of power modules connected in parallel to each other and included in an on-board charger (OBC) when the battery charging operation enters a constant voltage (CV) charging section while the battery is charged through the OBC, a load imbalance phenomenon may be prevented from occurring between the power modules in the CV charging section. For example, when a high-capacity multi-parallel OBC scheme is employed to reduce a time elapsed to charge a high-voltage battery for an electric vehicle, the load imbalance phenomenon may be fundamentally prevented from occurring between power modules in the CV charging section.

In addition, according to the present disclosure, since any information required to be updated while synchronizing with a control period does not exist in signals transmitted/received between controllers, it is possible to easily implement the charging apparatus through control area network (CAN) communication.

In the description above, although all of the components of the embodiments of the present disclosure may have been explained as assembled or operatively connected as a unit, the present disclosure is not intended to limit itself to such embodiments. Rather, within the objective scope of the present disclosure, respective components may be selectively and operatively combined in any numbers. Also, every one of the components may be implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure.

What is claimed is:

1. A charging apparatus mounted in a vehicle, the charging apparatus comprising:
   at least two power modules configured to be parallel to each other to convert input power applied from an outside into a charging power for charging a battery;
   at least two slave controllers configured to:
     output information about whether each of the at least two power modules enters a constant-voltage charging mode, based on the charging power output from the at least two power modules;
     compare an output current value ordered from a master controller with an output current threshold current value; and
     transfer, to the master controller, a comparison result as the information about whether the each of the at least two power modules enters the constant-voltage charging mode; and
   the master controller configured to:
     receive the information from the at least two slave controllers;
     control one of the at least two slave controllers when each of the at least two power modules enters a constant-voltage charging mode; and
     operate one power module corresponding to the one of the at least two slave controllers.

2. The charging apparatus of claim 1, further comprising:
   a first filter configured to remove a switching ripple of the input power and to output a ripple-removed input power to the at least two power modules; and
   a second filter configured to reduce a switching ripple of the charging power output from the at least two power modules.

3. The charging apparatus of claim 1, wherein each of the at least two power modules comprises:
   a power factor correction converter configured to convert AC power input from an outside into DC power and perform power factor correction; and
   a DC-DC converter configured to convert the DC power into a charging voltage for charging the high-voltage battery.

4. The charging apparatus of claim 1, wherein the output current value ordered from the master controller is a maximum output current value allowable in a constant current charging section.

5. The charging apparatus of claim 1, wherein the output current value ordered from the master controller is a value obtained by dividing a maximum output power value able to be output in a constant current charging section by an actually measured output voltage.

6. The charging apparatus of claim 1, wherein the master controller comprises an OR gate configured to OR-operate the information, which is output from the at least two slave controllers, about whether the at least two power modules enter the constant-voltage charging mode.

7. The charging apparatus of claim 6, wherein the master controller determines whether the at least two power modules enter the constant-voltage charging mode, based on an output of the OR gate.

8. The charging apparatus of claim 6, wherein the master controller determines that the at least two power modules enter the constant-voltage charging mode when receiving, from the at least two slave controllers, information about that the at least two power modules enter the constant-voltage charging mode.

9. The charging apparatus of claim 1, wherein the master controller provides, as an output voltage value ordered from the master controller, a maximum value in a driving voltage range of the high-voltage battery to one of the at least two slave controllers, and provides, as an output voltage direction value, '0' to remaining slave controllers.

10. The charging apparatus of claim 1, wherein the master controller provides an output voltage value ordered from the master controller, a maximum value of an allowable output current, a maximum value of an output power able to be output, and an output current threshold current value to each of the at least two slave controllers.

11. The charging apparatus of claim 10, wherein the output current threshold current value corresponds to an output current at a time point of switching from a constant-power charging section to a constant-voltage charging section.

* * * * *